United States Patent [19]

Sobel

[11] Patent Number: 4,686,772

[45] Date of Patent: Aug. 18, 1987

[54] ELECTRONIC MAGNETIC COMPASS SYSTEM

[75] Inventor: Amos Sobel, Haifa, Israel

[73] Assignee: Elbit Computers Ltd., Haifa, Israel

[21] Appl. No.: 866,719

[22] Filed: May 27, 1986

[30] Foreign Application Priority Data

May 23, 1986 [IL] Israel .................................. 78889

[51] Int. Cl.$^4$ ...................... G01C 17/28; G01C 17/38
[52] U.S. Cl. ...................................... 33/333; 33/356; 33/361
[58] Field of Search ................. 33/333, 352, 356, 361; 73/1 E

[56] References Cited

U.S. PATENT DOCUMENTS

| | | | |
|---|---|---|---|
| 3,696,518 | 10/1972 | Leat | 33/357 |
| 3,744,312 | 7/1973 | Anderson | 33/356 |
| 4,300,390 | 11/1981 | Shimizu | 33/352 |
| 4,327,498 | 5/1982 | Setter et al. | 33/333 |

Primary Examiner—Richard R. Stearns
Attorney, Agent, or Firm—Benjamin J. Barish

[57] ABSTRACT

An electronic magnetic compass for computing the magnetic heading of a vehicle, such as a tank, having two iron bodies relatively movable with respect to each other about a vertical rotary axis comprises: a non-pendulous triaxial magnetometer outputting magnetic field electrical signals representing the three axial components of the magnetic field at the location of the magnetometer; sensors outputting electrical signals representing the pitch and roll of the vehicle body on which the sensors are mounted; an angle measuring device for outputting electrical signals corresponding to the angle of rotation between the two bodies; a memory for storing a plurality of pre-calibrated correction factors for correcting the effects of the permanent magnetic field and the induced magnetic field on the measurements of the magnetometer for each of a plurality of angles of rotation between the two bodies; and an electronic computer for computing on a real-time basis the magnetic heading of both bodies from the magnetic field electrical signals as corrected by the stored correction factors for the respective angle of rotation, together with the pitch, roll and rotation angles electrical signals inputted into the computer.

14 Claims, 8 Drawing Figures

ELECTRONIC MAGNETIC COMPASS SYSTEM

BACKGROUND OF THE INVENTION

The present invention relates to electronic magnetic compasses for use on iron body vehicles, and particularly on vehicles having two iron bodies relatively movable with respect to each other about a vertical rotary axis, such as a tank having a turret rotatable on a hull. The purpose of such compasses is to determine the magnetic heading or azimuth of the vehicle by detecting the direction of the Earth magnetic field in the horizontal plane.

Every iron body has a naturally occurring permanent magnetic field resulting from permanently magnetized crystals in the iron. This permanent magnetic field adds vectorially to the Earth's. In addition, every iron body has a variable magnetic field induced by passing through the Earth's field. This variable field is linearly related to that of the Earth and also adds vectorially to it. These two additional vector components are also detected by a magnetic compass thereby causing erroneous readings.

Since all these effects occur in a three dimensional space, they can be mathematically modeled by three dimensional vector algebra. The vector model is derived from the original description by D. Poisson published in the Memoir of the Institut de France, 1824.

This model can best be described by looking at the Earth's magnetic field from two frames of reference: the Earth frame and the vehicle frame.

If F is the vector of Earth's magnetic field strength at the compass location, then, in the Earth frame of reference with base vectors, $\bar{1}n$, $\bar{1}e$, $\bar{1}v$ directed North, East and nadir respectively, $\bar{F}$ will be described as:

$$\bar{F} = \bar{1}nFn + \bar{1}eFe + \bar{1}vFv \tag{1}$$

In the vehicle frame of reference with base vectors, $\bar{1}x$, $\bar{1}y$, $\bar{1}z$ directed Forward, Starboard and Down respectively, F would be described as:

$$\bar{F} = \bar{1}xFx + \bar{1}yFy + \bar{1}zFz \tag{2}$$

The Earth's magnetic field is also commonly described by its field strength F, its declination, and its inclination:

$$Fn = F\cos\nu\cos\delta \tag{3}$$

$$Fe = F\cos\nu\sin\delta$$

$$Fv = F\sin\nu$$

Field strength, declination and inclination for every location can be derived from special maps or measured by special instruments.

The relation between the description of the field vector in the two frames of reference is given by the Euler relations:

$$\bar{F}_{(x,y,z)} = T_\phi T_\theta T_\psi \bar{F}_{(n,e,v)} \tag{4}$$

Where $\Psi, \theta, \phi$ are the azimuth, pitch and roll angles of the vehicle and $T_\psi$, $T_\theta$, $T_\phi$ are the respective Euler rotation matrices.

The magnetic field $\bar{M}$ at the compass location on an iron body vehicle can be described as:

$$\bar{M} = \bar{H} + (U' + I)T_\phi T_\theta T_\psi \bar{F} \tag{5}$$

Matrix U' provides for the effect of the vehicle's induced magnetism. Matrix I is a unity matrix providing for the original Earth magnetic field that exists at the compass location if the vehicle were made of wood. Vector $\bar{H}$ is the magnetic field caused by the permanent magnetism of the vehicle. This equation can be shortened; if we let $U = U' + I$, then:

$$\bar{M} = \bar{H} + UT_\phi T_\theta T_\psi \bar{F} \tag{6}$$

This equation gives a very accurate account of the magnetic situation of an iron body vehicle based on the assumption of linearity. In other words, it is assumed that the vehicle's iron does not become saturated at the field strength of 0.5 gauss (the Earth magnetic field strength). This assumption is justified on the basis of the types of steel used on tanks.

Poisson's original description, as set forth for example, on page 270 of the book "Magnetic Compasses and Magnetometers" by Alfred Hine, used different notations. Poisson expressed the magnetic field at the compass position of a ship by the equations:

$$X_1 = X + aX + bY + cZ + P$$

$$Y_1 = Y + dX + eY + fZ + Q$$

$$Z_1 = Z + gX + hY + kZ + R$$

where X, Y and Z are three orthogonal components of the Earth's magnetic field; $X_1$, $Y_1$ and $Z_1$ are three components of the total field at the compass position, directed respectively to forward, to starboard and perpendicular to the keel; a to k represent nine soft-iron rod, a mathematical conception as the rods as such have no physical existence; and P, Q and R are the components of the permanent magnetic field.

It can be readily seen that the components P, Q and R are the equivalent to the Vector H, and that the factors a to k are the equivalent of Matrix U'.

The explicit description of the Euler rotation matrices is as follows:

$$T_\psi = \begin{bmatrix} \cos\psi & \sin\psi & 0 \\ -\sin\psi & \cos\psi & 0 \\ 0 & 0 & 1 \end{bmatrix}$$

$$T_\theta = \begin{bmatrix} \cos\theta & 0 & -\sin\theta \\ 0 & 1 & 0 \\ \sin\theta & 0 & \cos\theta \end{bmatrix}$$

$$T_\phi = \begin{bmatrix} 1 & 0 & 0 \\ 0 & \cos\phi & \sin\phi \\ 0 & -\sin\phi & \cos\phi \end{bmatrix}$$

Vector H and matrix U can also be used to describe the magnetic effects of the iron body of a tank. In this case H and U are not constant but are a function of the turret-to-hull traverse angle, indicated hereafter as Equation (6) then takes the form:

$$\bar{M} = \bar{H}(\alpha) + V(\alpha)T_\phi T_\theta T_\psi \bar{F} \tag{6a}$$

The meaning of this is that each component of "$\overline{H}$" and "U" takes a different value for each position of the turret relative to the hull of the tank.

The inverse of equation 6a is the basic equation of the compass, namely:

$$W(\alpha) = V^{-1}(\alpha) \quad (7)$$

$$\overline{A} = T_\psi \overline{F} = T_\theta^{-1} T_\phi^{-1} W(\alpha)[\overline{M} - \overline{H}(\alpha)]$$

$$\psi = \delta - tg^{-1} \frac{A_y}{A_x}$$

Vector A represents the magnetic field seen in a horizontal frame of reference at the compass location.

Equation 7 can be implemented on an analog or a digital computer to compute the magnetic azimuth or heading of a vehicle using data supplied by triaxal magnometer and a dual inclinometer or a vertical gyro.

Electronic magnetic compasses of this type are described in U.S. Pat. Nos. 3,596,069; 3,696,518 and 4,414,753; and in British Pat. No. 591,019. These patents, however, do not deal particularly with vehicles having two iron bodies relatively movable with respect to one another, such as tanks having a turret rotatable on a hull, especially the influences of the permanent and induced magnetic fields on the readings of the compass of such vehicles.

Israeli Pat. No. 64237 describes a magnetic compass particularly for vehicles having two relatively movable iron bodies, but the manner for correcting the influence of the permanent magnetic field and the induced magnetic field on the readings of the compass is different from that of the present invention, as will be described more particularly below.

SUMMARY OF THE PRESENT INVENTION

The present invention relates to an electronic magnetic compass system for computing the magnetic heading of a vehicle having two iron bodies relatively movable with respect to each other about a vertical rotary axis comprising;

a non-pendulous triaxial magnetometer to be fixed mounted on one of said bodies for outputting electrical signals corresponding to the three axial components on the magnetic field at the location of the magnetometer;

a first sensor on said one body for outputting electrical signals corresponding to the pitch of said one body;

a second sensor on said one body for outputting electrical signals corresponding to the roll of said one body;

an angle measuring device for outputting electrical signals corresponding to the angle of rotation between said two bodies about said vertical rotary axis;

a non-volatile memory for storing a plurality of pre-calibrated correction factors for correcting the effects of the permanent magnetic field and the induced magnetic field on the measurements of the magnetometer for each of a plurality of angles of rotation between the two bodies;

and an electronic computer for computing on a real-time basis the magnetic headings of both said bodies from said magnetic field electrical signals, as corrected by said stored correction factors for the respective angle of rotation, together with the pitch, roll and rotation angles electrical signals inputted into the computer.

It will thus be seen that the vehicle includes a magnetometer, on only one of the two bodies of the vehicle, and bases the pre-calibrated correction factors on different angles of rotation (traverse angles) between the two bodies, e.g., between the turret and the hull of a tank. Such an arrangement is to be distinguished from that described in the above-cited Israel patent, wherein the magnetic compass includes two magnotometers, one on each of the two relatively movable bodies (the tank turret and tank hull), and bases the pre-calibrated correction factors on the readings of the two magnetometers.

The particular algorithms by which the correction factors are pre-calibrated on the one hand, and by which, on the other hand, , the true headings are determined on a real-time basis from these correction factors and the inputted data, are illustrated in the accompanying drawings and are described below.

BRIEF DESCRIPTION OF THE DRAWINGS

The invention is herein described, by way of example only, with reference to the accompanying drawings, wherein.

MATHEMATICAL ANALYSIS

The following mathematical analysis will be helpful in understanding the construction and mode of operation of the electronic magnetic compass system illustrated in the drawings as a preferred embodiment of this invention.

As briefly described earlier, the magnetic compass includes, in addition to a magnetometer and sensors for sensing the magnetic field, pitch and roll, also an angle measuring device for sensing the angle of rotation (traverse angle) of the tank turret with respect to the tank hull, and a memory for storing a plurality of pre-calibration correction factors for correcting the effects of the permanent magnetic field and the induced magnetic field on the measurements of the magnetometer for each of a plurality of traverse angles of the respective vehicle. Thus, the magnetic compass memory stores, for each traverse angle, the influences of the induced magnetic field, designated as parameters of the $W(\alpha)$ function, and of the permanent magnetic field, designated as parameters of the $\overline{H}(\alpha)$ function. The parameters of the $W(\alpha)$ function is a matrix of nine numbers, and the parameters of the $\overline{H}(\alpha)$ function is a vector of three numbers, as developed by Poisson and as described above.

A Fourier series is used for the approximation of the $W(\alpha)$ and the $\overline{H}(\alpha)$ functions. Thus, these two functions take the matrix forms;

$$W(\alpha) = (\tfrac{1}{2}) A^W_0 + \sum_{j=1}^{N} A^W_j \cos(j\alpha) + B^W_j \sin(j\alpha)$$

$$H(\alpha) = (\tfrac{1}{2}) A^H_0 + \sum_{j=1}^{N} A^H_j \cos(j\alpha) + \overline{B}^H_j \sin(j\alpha)$$

wherein "N", the number of harmonics in the Fourier series, is preferably chosen as "8"; $A^w$, $B^w$ are 17 constant $3\times3$ matrices; and A, B, are 17 constant $3\times 1$ vectors.

For example, the first element of $U(\alpha)$, which is $W(1,1)(\alpha)$ will take the form:

$$W_{(1,1)}(\alpha) = A^W_0(1,1) + \sum_{j=1}^{N} A^w_j(1,1)\cos(J\alpha) + B^w_j(1,1)\sin(j\alpha)$$

In order to evaluate these constants, one has first to find the values of $W(\alpha)$ and $\overline{H}(\alpha)$ at a predetermined number, e.g. 16, evenly spaced positions of the tank turret with respect to the hull, starting at $\alpha=0$. This is done in the calibration process. Preferably the calibration is done as follows:

To evaluate W and H for one position of the tank turret, the vehicle is located on at least two non-parallel inclined surfaces at four different headings. At each of these four positions, numbered 0 to 3, readings are taken of the vehicle, azimuth, pitch, roll and the magnetometer output. The magnetometer readings are marked as $\overline{M}_0, \overline{M}_1, \overline{M}_2, \overline{M}_3$ and the vehicle azimuth, pitch and roll, are marked as $\Psi_0, \Psi_1, \Psi_2, \Psi_3, \theta_0, \theta_1, \theta_2, \theta_3, \phi_0, \phi_1, \phi_2, \phi_3$ respectively.

Surveying instruments, such as a theodolite or an inertial platform, may be mounted on the vehicle to enable measurement of its azimuth, pitch and roll.

The magnetic declination ($\delta$) and inclination ($\gamma$) may be taken for the calibration area from maps and used to calculate the components of Vector F according to Equation (3) above; the field strength F can be taken as unity.

Now the vectors $\overline{F}_0-\overline{F}_3$ may be calculated from the following:

$$\overline{F}_0 = T_{\phi 0}\, T_{\theta 0}\, T_{\psi 0}\, \overline{F} \tag{10}$$

$$\overline{F}_1 = T_{\phi 1}\, T_{\theta 1}\, T_{\psi 1}\, \overline{F}$$

$$\overline{F}_2 = T_{\phi 2}\, T_{\theta 2}\, T_{\psi 2}\, \overline{F}$$

$$\overline{F}_3 = T_{\phi 3}\, T_{\theta 3}\, T_{\psi 3}\, \overline{F}$$

and Matrix E:

$$E = \left[\, \overline{F}_1 - \overline{F}_0 \quad \overline{F}_2 - \overline{F}_0 \quad \overline{F}_3 - \overline{F}_0 \,\right] \tag{11}$$

and Matrix N:

$$N = \left[\, \overline{M}_1 - \overline{M}_0 \quad \overline{M}_2 - \overline{M}_0 \quad \overline{M}_3 - \overline{M}_0 \,\right] \tag{12}$$

Since from equation (6) we known that:

$$\overline{M}_1 - \overline{M}_0 = U(\overline{F}_1 - \overline{F}_0) \tag{13}$$

then: $N = U\, E$ $$U = N\, E^{-1},\ W = U^{-1} \tag{14}$$

and $$\overline{H} = M_0 - U\, \overline{F}_0 \tag{15}$$

"W" and "$\overline{H}$" derived in this way can be used directly in a compass mounted on a non-turrent vehicle. For a tank, this process has to be repeated 16 times as stated earlier to derive matrices $W_0-W_{15}$ and vectores $\overline{H}_0-\overline{H}_{15}$.

The matrices of the parameters of the Fourier series which are used to approximate $W(\alpha)$ and $\overline{H}(\alpha)$ for all the values of "$\alpha$" in the 16 turret positions used for calibration as set forth in equation (9), will be derived from $W_0-W_{15}$ and $\overline{H}_0-\overline{H}_{15}$. This can be done using any well known mathematical algorithm.

DESCRIPTION OF A PREFERRED EMBODIMENT

Overall Construction

Figure 1:
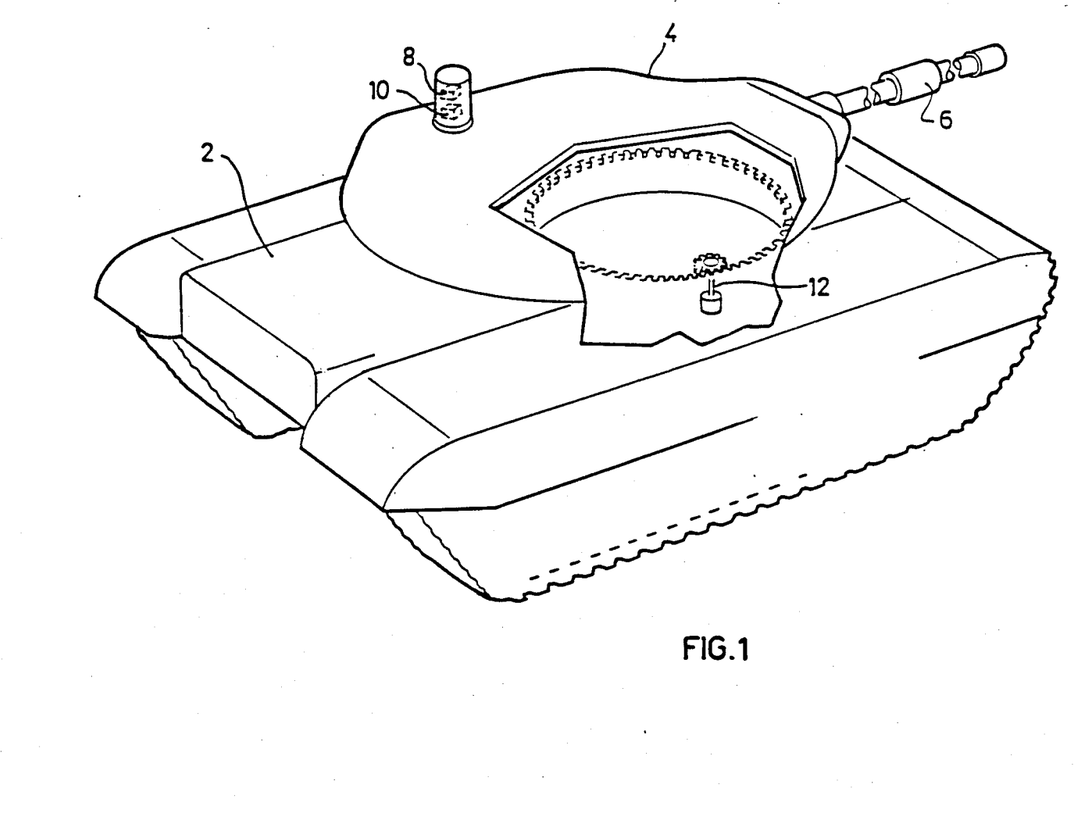
FIG. 1 diagramatically illustrates a tank equipped with an electronic magnetic compass system in accordance with the present invention.

The invention is herein described with respect to a tank, as illustrated in FIG. 1, including a hull 2 having a rotatable turret 4 carrying a cannon 6. A magnetometer 8 is preferably mounted on the turret 4 diametrically opposite to the cannon 6 so as to minimize its influence when changing the elevation of the cannon. Magnetometer 8 is a non-pendulous triaxial magnetometer outputting analog signals (Mx, My, Mz) proportional to the three axial components of the magnetic field at the location of the magnetometer.

The illustrated magnetic compass system further includes two sensors in the form of non-parallel inclinometers 10, preferably located in the same housing as magnetometer 8. Inclinometers 10 measure the deviations of the turret 4 from the horizontal plane about its longitudinal axis, representing pitch ($\theta$), and about its transverse axis, representing roll ($\phi$).

The illustrated magnetic compass system further includes an angle measuring device 12 for outputting an electrical signal ($\alpha$) corresponding to the angle of rotation of the turret 4 about its vertical axis, thereby representing the traverse angle of the turret with respect to the hull 2. Such a device may conveniently be a shaft encoder measuring the relative angle between the turret and hull.

Figure 2:
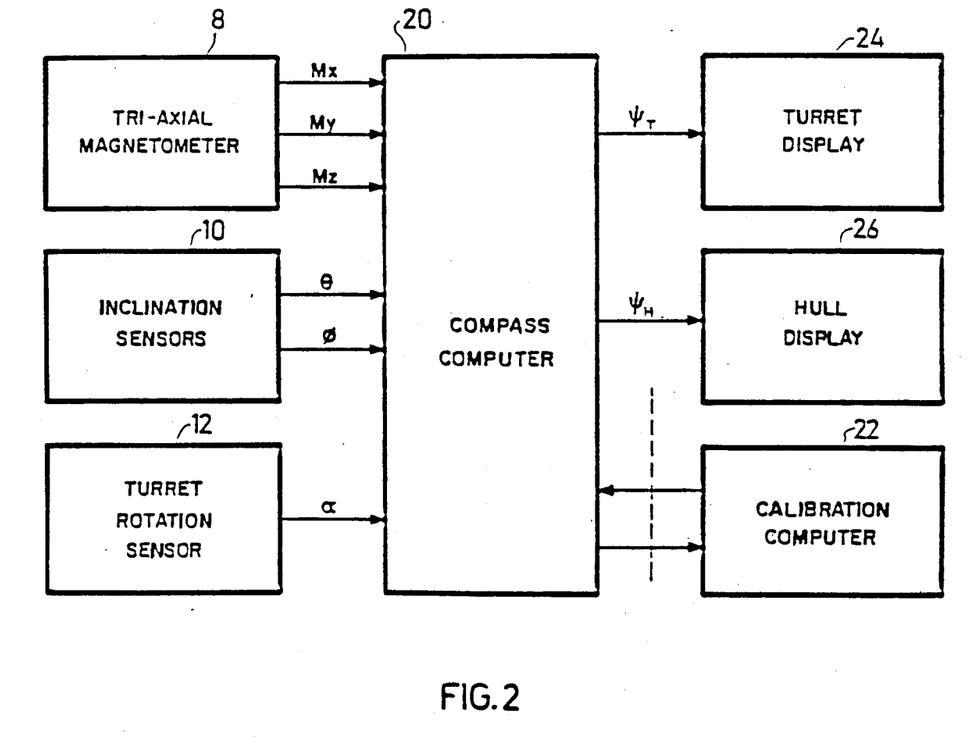
FIG. 2 is a block diagram illustrating the main components of the electronic compass system.

As shown in the block diagram of FIG. 2, the magnetic compass system further includes a computer unit 20 which receives inputs Mx, My, Mz from the magnetometer 8, inputs $\phi$ (pitch) and $\phi$ (roll) from the dual inclinometer 10, and input α (traverse angle) from the traverse angle sensor 12. FIG. 2 also illustrates the calibration computer 22 which, during the calibration phase, is used to compute the correction factors stored in the memory of the compass computer 20 which are used by computer 20 in the real-time determination of the magnetic headings. Once the pre-calibrated correction factors have been stored in the compass computer 20, the calibration computer 22 is removed and is no longer used unless and until these correction factors are to be recalibrated. The output of computer unit 20 is fed to the turret display 24, which displays the magnetic or true heading of the turret 4, and to a hull display 26 which displays the magnetic or true heading of the hull 2.

Figure 3:
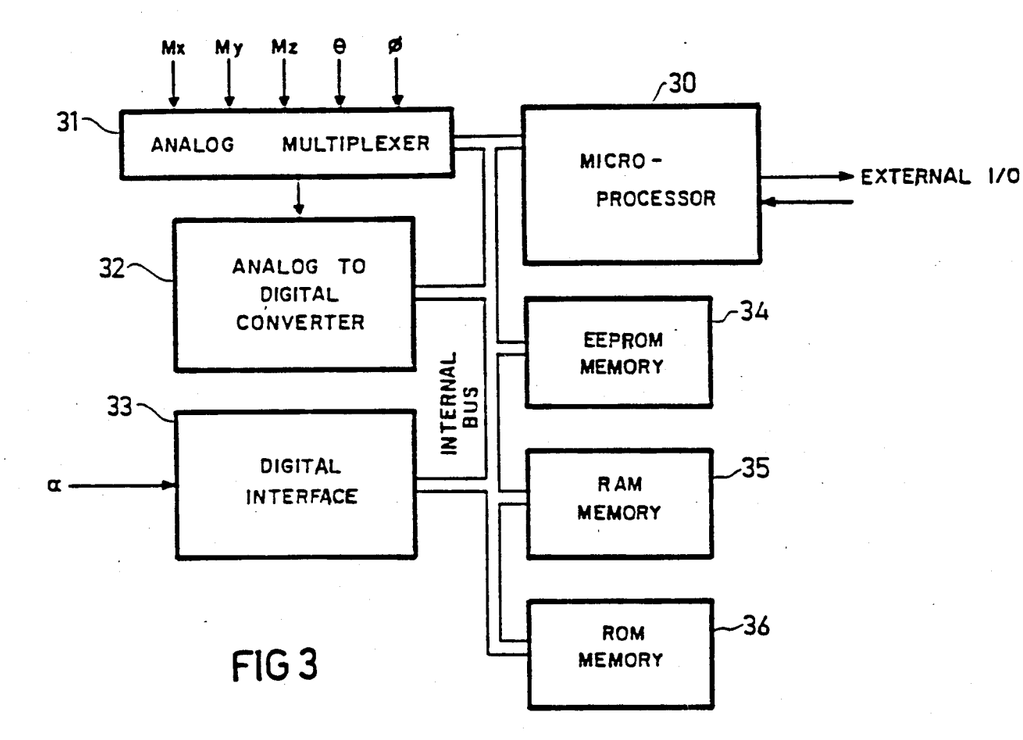
FIG. 3 is a block diagram illustrating the main components of the electronic computer used in the compass system of FIG. 2.

FIG. 3 illustrates the components of the compass computer 20. It includes a micro-processor 30 receiving the magnetic field data ($M_x$, $M_y$, $M_z$) from the magnetometer 8, and the measured pitch ($\theta$) and roll ($\phi$) data from the dual inclinometer 10. Thus data is inputted via a multiplexer 31 controlled by the microprocessor and is fed to a converter 32 which converts this inputted data to digital form because fed into the microprocessor. The microprocessor also receives the travers angle ($\alpha$) data from the traverse angle sensor 12, which data is applied to a digital interface 33 before being inputted into the micro-processor.

The computer illustrated in FIG. 3 includes three types of memories, namely: an EEPROM (Electronic Erasable Programmable Read Only Memory) 34, in which are stored the correction factors pre-calibrated by the calibration computer 22 (FIG. 2) based on the magnetometer, azimuth, pitch and roll readings for a plurality (in this case, 16) of traverse angles ($\alpha$); a RAM (Random Access memory) 35, serving as a temporary storage for the variables; and a ROM (Read Only Memory) 36, for storing the computer program.

Figure 4:
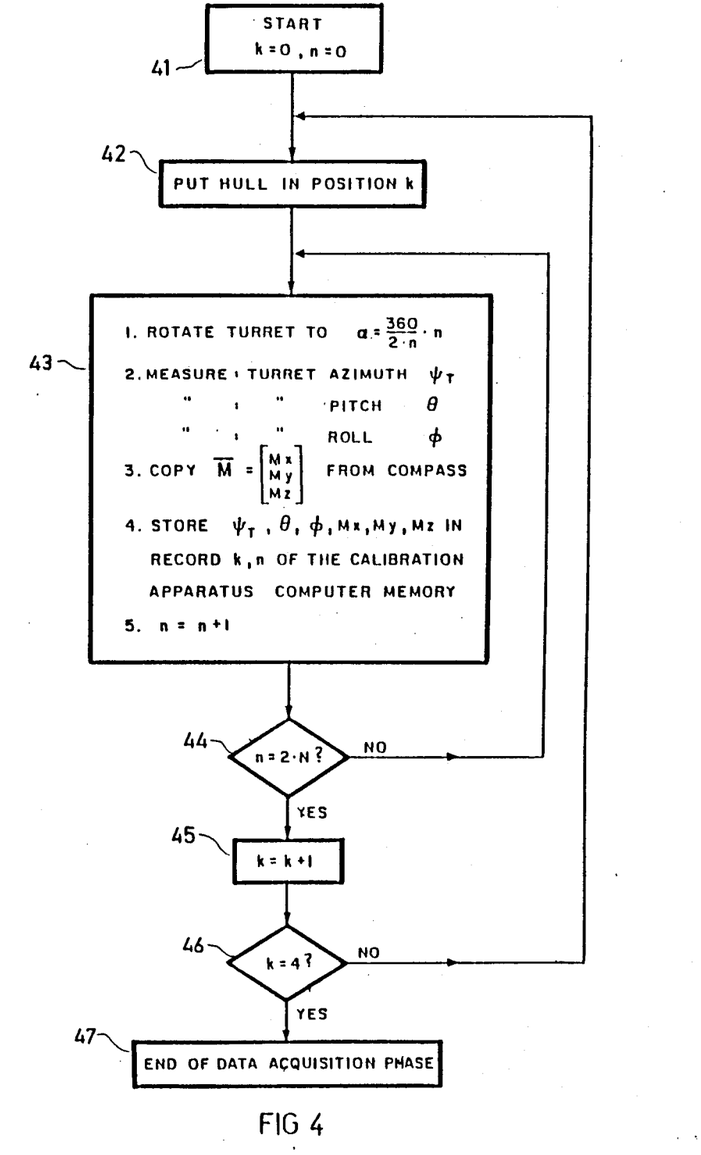
FIG. 4 is a flow diagram illustrating the data acquisition phase in computing the correction factors to be used in the real time operation of the magnetic compass system to determine magnetic headings.
Figure 5A:
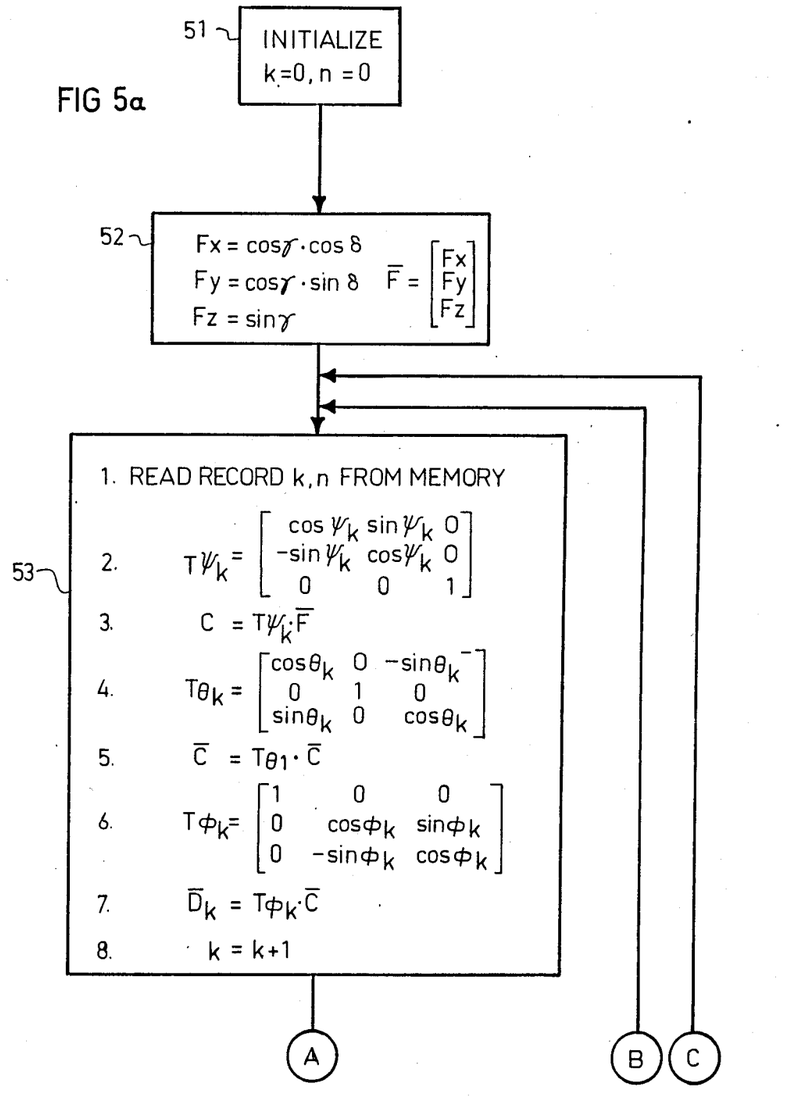
FIGS. 5a and 5b are flow diagrams illustrating the operation of the calibration computer for producing the correction factors to be stored in the calibration computer memory for later use in the calculation of the Fourier coefficients.
Figure 5B:
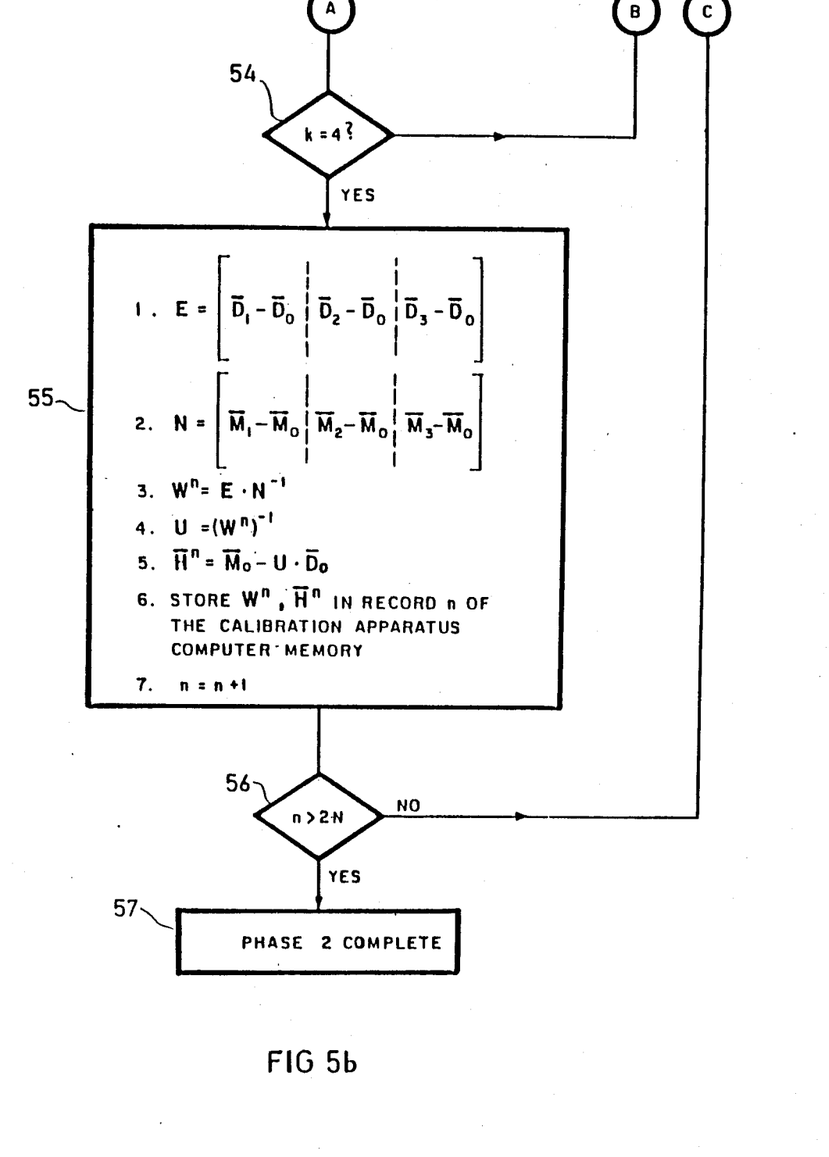
Figure 6:
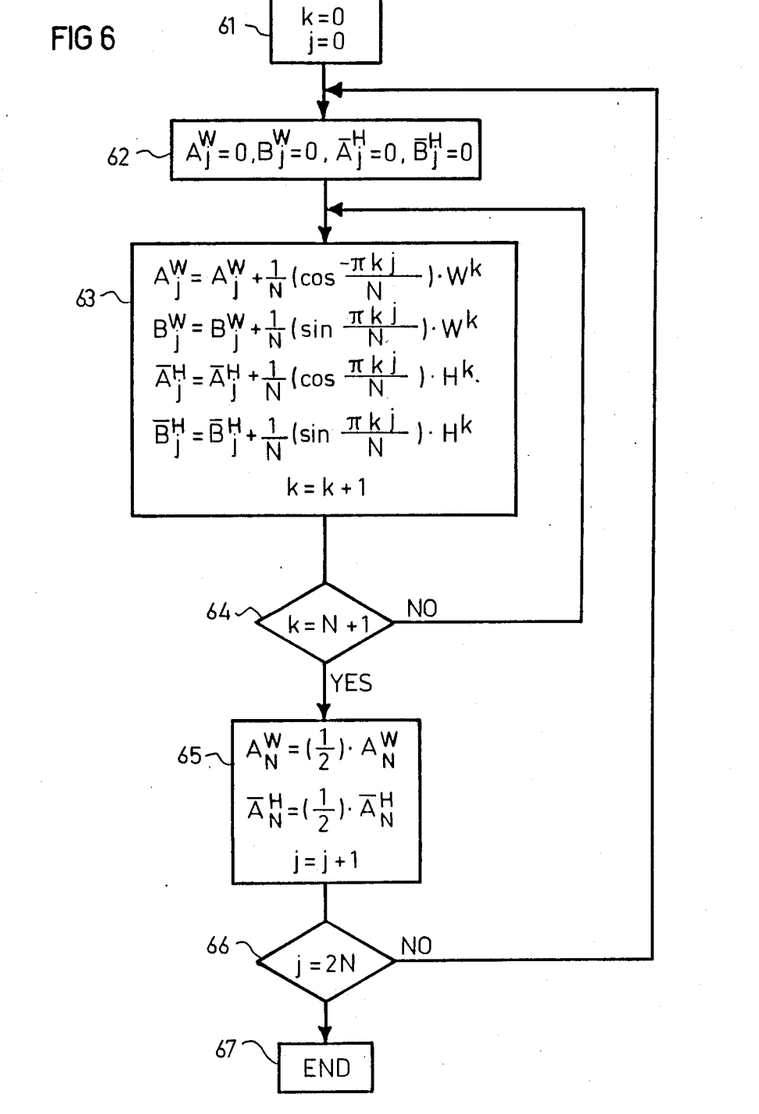
FIG. 6 is a flow diagram illustrating the manner by which the calibration computer computes the Fourier coefficients from the correction factors, which coefficients are stored in the memory of the magnetic compass computer system and are used for recreating in the magnetic compass system the correction factors to be used for computing the magnetic headings on a real-time basis.

Calibration Procedure (FIGS. 4-6)

The calibration procedure is followed in order to determine the parameters of the W($\alpha$) function representing the induced magnetic field influences, and the $\bar{H}(\alpha)$ function representing the permanent magnetic field influences for the particular tank with respect to a plurality of traverse angle positions of ($\alpha$) the tank turret 4 with respect to the tank hull 2. The determination of these parameters during the calibration procedure is governed by the calibration computer 22 (FIG. 2) which stores the parameters in the EEPROM 34 (FIG. 3) of the compass computer; following the calibration, computer 22 is detached from the compass system and is not further used unless the particular tank is to be recalibrated.

The first phase of the calibration procedure is the data collection phase as illustration by the flow diagram of FIG. 4. During this phase, the tank is located in each of a plurality (4 in this case) of positions of different headings and inclinations and the turret 4 is rotated to a plurality (n) of traverse angles ($\alpha$), while the calibration computer collects magnetometer readings ($M_x$, $M_y$, $M_z$) and measured values of pitch (0), roll (0) and azimuth ($\Psi_T$). In this example, k=4 and n=16. This number (n) of traverse angles is determined by the number (N) of Fourier harmonics to be used in determining the correction functions, the number of traverse angle positions being double the number of harmonics. In the example illustrated in FIG. 4, there are eight harmonics (N) and therefore there are 16 traverse angle positions (n=2N).

The data acquisition phase of the calibration procedure thus proceeds as follows, as illustrated in the flow diagram in FIG. 4.

The vehicle position counter "k" and the turret position counter "n" are both set to 0 (block 41). The hull 4 is then located at the first hull position (block 42), and the turret is rotated to the first traverse angle ($\alpha$=0). In this position, measurements are made of turret azimuth ($\Psi_T$), pitch ($\theta$) and roll ($\phi$), and the magnetic field is read by the magnetomoter. The values $\Psi_T$, $\theta$, $\phi$, $M_x$, $M_y$, $M_z$ are recorded in the calibration computer memory (block 43).

For the same hull location (k=0), the turret-position counter (n) is incremented one position, so that the turret angle ($\alpha$) is now 22.5 degrees (360°/16=22.5°). The above measurements at this position of the turret are made and stored in the calibration computer memory.

The foregoing proceedure is performed altogether 2N (16) times (block 44) with the hull at the first location (k=0), such that 16 sets of measurements are taken and recorded in the calibration computer memory for each of the 16 positions of the turret.

The hull is then positioned in a second hull position (k=1), and the procedure is repeated while the vehicle is in this position for 2N (16) equally spaced angle positions of the turret. The procedure is then repeated for a third hull position (k=2), and for a fourth hull (k=3), such that at the end of the data acquisition phase (block 47), the memory in the calibration computer (22, FIG. 2) has stored therein 64 sets of numbers, with each set including the values of azimuth ($\Psi_T$) pitch ($\theta$), roll ($\phi$), and the three axial magnetic field measurements $M_x$, $M_y$, $M_z$.

After the data collection phase has been completed, the calibration program in the calibration computer 22 (FIG. 2) performs the second phase of the calibration procedure. During the second phase, correction factors are calculated for each of the 16 turret positions. This phase of the calibration procedure is illustrated in FIG. 5.

In this phase, the "n" and "k" counters are again set to 0 (block 51); the field strength (F) declination ($\delta$) and inclination ($\gamma$) for that particular location, as available from special maps or measured by special instruments, are entered into the calibration computer; and the field strength components ($F_x$, $F_y$, $F_z$) are calculated according to the equations appearing in block 52 of the flow diagram in FIG. 5. The three Euler rotation matrices are then produced as shown in block 53 in FIG. 5 for the hull position k=0.

The above process is then repeated for hull position k=1, K=2, k=3 (four hull positions), and when k=4 (block 54), the calibration procedure then produces the matrix E from the turret angles and matrix N from the magnetometer readings.

The first correction factor matrix W is then produced, and that matrix is inverted to produce the correction factor matrix U, which represents the induced magnetic field influence. The first correction factor vector H is then produced, which represents the permanent magnetic field influence. The nine values representing the matrix of the correction factors W corresponding to the induced magnetic field influence, and the three values representing the vector correction factor H corresponding to the permanent magnet influence, are stored in the calibration computer memory 22 (FIG. 2) for the first turret position (n=0).

The above procedure is repeated 15 more times (block 55), with the turret advanced 22.5 degrees between each repetition. Thus, when the second phase of the calibration procedure has been completed, the calibration memory has stored therein 16 values of W, representing the correction factor for the induced magnetic field, and 16 values of $\overline{H}$, representing the correction factors for the permanent magnetic influence.

FIG. 6 illustrates the third phase of the calibration procedure, during which the Fourier coefficients are calculated from the correction factors (W,$\overline{H}$). This produces 17 matrices of coefficients for W and 17 vectors of coefficients for $\overline{H}$. It is these coefficients which are stored in the EEEPROM 34 (FIG. 3) of the compass computer system. As soon as these values have been stored, the calibration procedure is completed, and the calibration computer may be disconnected from the compass computer.

Figure 7:
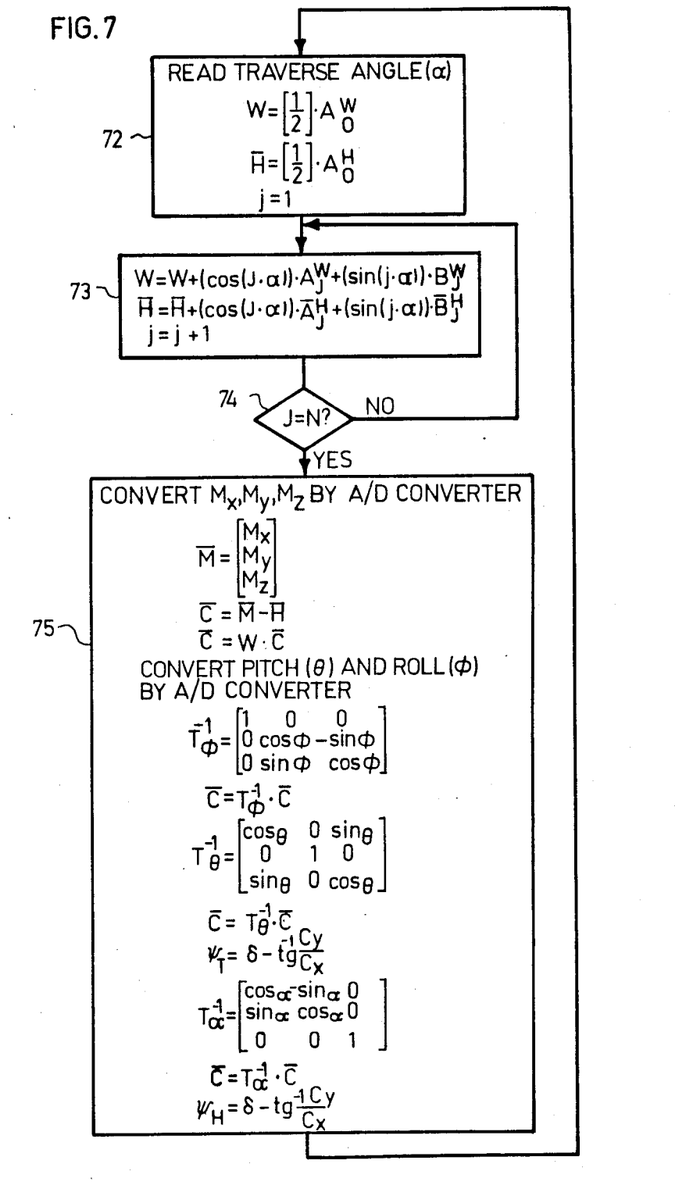
FIG. 7 is a flow diagram illustrating the operation of the magnetic compass system for computing on a real-time basis the magnetic headings of both the turret and the hull from the inputted data together with the stored correction factors.

Real Time Computation of Headings (FIG. 7)

During the real-time operation of the compass system, the magnetic headings of the turret and hull are continuously computed by the computer 20 (FIG. 2) and are displayed in the turret display 24 and hull display 26. During this operation of the compass system, the calibration computer 22 is disconnected and is not used.

As shown in the flow diagram of FIG. 7, the traverse angle sensor 12 inputs the traverse angle ($\alpha$) to the computer 20 (block 72). Space in the RAM 35 (FIG. 3) is assigned to "W", representing the induced magnetization correction matrix, and to "H", representing the permanent magnetization factor. One-half of the correction matrix $A^W{}_0$ is stored in the matrix memory space assigned to "W" and one half of the correction vector $\overline{A}^H{}_0$ is stored in memory space "$\overline{H}$" (block 72). The computer then enters into a loop which repeats itself "N" times (the number of harmonics in the Fourier series). In each iteration, the computer performs the summation indicated in block 73 in the memory spaces for both the matrix "W" and vector "$\overline{H}$". At the end of "N" summations (block 74), the memory space assigned to matrix "W" contains an approximation of the induced magnetization correction matrix, and the memory space assigned to the vector "H" contains an approximation of the permanent magnetization vector, both for the specific traverse angle ($\alpha$) as measured by sensor 12.

Micro-processor 30 (FIG. 3) then commands the multiplexer 31 to input the three components of the magnetic field ($M_x$, $M_y$, $M_z$) to the converter 32. The converter converts these components to digital form and inputs it into the micro-processor, which stores the three values as vector "M" in the RAM 35.

The computer then subtracts "$\overline{H}$" from "M"; stores the intermediate result in memory location "$\overline{C}$"; multiplies that result with "W"; and stores the result again in memory location "$\overline{C}$", all as shown in block 75 of FIG. 7.

As shown in block 75 of FIG. 7, the pitch ($\theta$) and roll ($\phi$) as measured by the dual inclinometer 10 are then converted to digital values by converter 24 (FIG. 3) and are used for producing the inverse of the Euler matrix of rotation in pitch ($T_\theta{}^{-1}$). This matrix is multiplied by the value in memory location "$\overline{C}$", and the result stored in the same memory location "$\overline{C}$".

The roll ($\phi$) is then used for producing the inverse Euler matrix of rotation in roll ($T_\phi{}^{-1}$), and this matrix is multiplied by the value in memory location "$\overline{C}$", with the result stored in memory location "$\overline{C}$".

The turret heading ($\Psi_T$) is then computed by first taking the arc tangent of the values stored in the "Y" location of memory space "$\overline{C}$" by the value stored in the "X" location of "C", and subtracting it from the declination ($\delta$). This latter, available from maps, was previously stored in the computer.

The traverse angle ($\alpha$) is then used for forming the inverse of the Euler matrix of rotation in respect of traverse angle ($T_\alpha{}^{-1}$). This matrix is multiplied by the value in memory space "$\overline{C}$" and restored there. This value is then used for computing the hull heading ($\Psi_H$) by taking the arc tangent of the value stored in the "Y" location of memory space "$\overline{C}$", divided by the value stored in the "X" location of memory space "$\overline{C}$", and subtracting this value from the known declination ($\delta$).

Upon the completion of these operations, as indicated in block 75 in FIG. 7, the computer then begins the next reiteration, reading the traverse angle value ($\alpha$) and repeating all the foregoing computations.

The turret heading, as determined by the computer, is continuously displayed in display unit 24 of FIG. 2, and the hull heading is continuously displayed in display unit 26.

While the invention has been described with respect to our preferred embodiment, it will be appreciated that many variations, modifications and other applications of the invention may be made. For example, other calibration methods may be used.

TABLE 1

$\Psi_T$ - TURRET AZIMUTH.
$\Psi_H$ - HULL AZIMUTH
$\alpha$ - HULL TO TURRET TRAVERSE ANGLE
$\phi$ - TURRET ROLL ANGLE
$\theta$ - TURRET PITCH ANGLE
$\overline{M}$ - MAGNETOMETER VECTOR
$\overline{H}$ - PERMANENT MAGNETIZATION VECTOR
W - INDUCED MAGNETIZATION CORRECTION MATRIX
$\overline{C},\overline{D}$ - INTERMEDIATYE CALCULATION VECTOR
U - INDUCED MAGNETIZATION MATRIX
$\delta$ - MAGNETIC DECLINATION OR VARIATION
$\chi$ - MAGNETIC INCLINATION OR DIP
$\overline{F}$ - EARTH MAGNETIC FIELD VECTOR
j,k,n - COUNTING VARIABLES
N - NUMBER OF FOURIER SERIES HARMONIES TYPICALY N = 8

What is claimed is:

1. An electronic magnetic compass system for computing the magnetic heading of a vehicle having two iron bodies relatively movable with respect to each other about a vertical rotary axis comprising;

a non-pendulous triaxial magnetometer to be fixedly mounted on one of said bodies for outputting electrical signals corresponding to the three axial components on the magnetic field at the location of the magnetometer;

a first sensor on said one body for outputting electrical signals corresponding to the pitch of said one body;

a second sensor on said one body for outputting electrical signals corresponding to the roll of said one body;

an angle measuring device for outputting electrical signals corresponding to the angle of rotation between said two bodies about said vertical rotary axis;

a non-volatile memory for storing a plurality of pre-calibrated correction factors for correcting the effects of the permanent magnetic field and the induced magnetic field on the measurements of the magnetometer for each of a plurality of angles of rotation between the two bodies;

and an electronic computer for computing on a real-time basis the magnetic headings of both said bodies from said magnetic field electrical signals, as corrected by said stored correction factors for the respective angle of rotation, together with the pitch, roll and rotation angles electrical signals inputted into the computer.

2. The system according to claim 1, wherein the vehicle is a tank having a turret rotatably mounted on a hull, said magnetometer, pitch sensor and roll sensor being mounted on said turret.

3. The system according to claim 2, wherein said electronic computer makes the following computations on a real time basis:

$$\bar{A} = T_\theta^{-1} T_\phi^{-1} W(\alpha)[\bar{M} - \bar{H}(\alpha)]$$

$$\bar{B} = T_\alpha^{-1} \bar{A}$$

$$\Psi_T = \delta - tg^{-1} Ay/Ax$$

$$\Psi_H = \delta - tg^{-1} By/Bx$$

wherein:
$\bar{A}, \bar{B}$,—intermediate calculation vectors;
$\Psi_T$—turret magnetic heading corrected by local declination;
$\Psi_H$—hull magnetic heading corrected by local declination;
$\delta$—local declination;
$\bar{M}$—magnetometer readings vector;
$\bar{H}(\alpha)$—permanent magnetism correction vector as a function of traverse angle;
$W(\alpha)$—induced magnetism correction matrix as a function of traverse angle;
$\phi$—turret roll;
$T_\phi^{-1}$—Euler inverse rotation matrix in roll;
$\theta$—turret pitch;
$T_\theta^{-1}$—*Euler inverse rotation matrix in pitch.*
$\alpha$—traverse angle; and
$T_\alpha^{-1}$—Euler inverse rotation matrix in traverse angle.

4. The system according to claim 1, wherein said pitch sensor and roll sensor are two non-parallel inclinometers.

5. The system according to claim 1, wherein said electronic computer includes a real-time computer for computing magnetic headings on a real-time basis, and a calibration computer for computing the calibration correction factors which are stored in said non-volatile memory of the real-time computer.

6. The system according to claim 5, wherein said calibration computer is a separate unit distinct from and detachable from the real-time computer after the calibration has been completed.

7. The system of claim 5, wherein said calibration computer performs the following operations:
during a data acquisition stage where the true or magnetic heading is known, inputs the magnetic field, pitch and roll values for each of a plurality of traverse angles of one of said iron bodies with respect to the other of said iron bodies;

for each of a plurality of traverse angles, calculates an induced magnetism correction matrix and a permanent magnetism correction vector;
and stores said correction matrix and correction vector for each of the said plurality of traverse angles in said non-volatile memory of the real-time computer.

8. The system according to claim 7, wherein said system is calibrated by said computer for 16 evenly-spaced traverse angles.

9. An electronic magnetic compass system for computing the magnetic heading of a tank having a turret rotatable on a hull about a vertical rotary axis comprising;
a non-pendulous triaxial magnetometer to be fixed mounted on said turret for outputting electrical signals corresponding to the three axial components on the magnetic field at the location of the magnetometer;
a first sensor on said turret for outputting electrical signals corresponding to the pitch of said turret;
a second sensor on said turret for outputting electrical signals corresponding to the roll of said turret;
an angle measuring device for outputting electrical signals corresponding to the angle of rotation between said turret and about said vertical rotary axis;
a non-volatile memory for storing a plurality of pre-calibrated correction factors for correcting the effects of the permanent magnetic field and the induced magnetic field on the measurements of the magnetometer for each of a plurality of angles of rotation between the turret with respect to the hull;
and an electronic computer for computing on a real-time basis the magnetic headings of both said turret and hull from said magnetic field electrical signals, as corrected by said stored correction factors for the respective angle of rotation, together with the pitch, roll and rotation angles electrical signals inputted into the computer.

10. The system according to claim 9, wherein said pitch, sensor and roll sensor are two non-parallel inclinometers.

11. The system according to claim 9, wherein said electronic computer includes a real-time computer for computing magnetic headings on a real-time basis, and a calibration computer for computing the calibration correction factors which are stored in said non-volatile memory of the real-time computer.

12. The system according to claim 11, wherein said calibration computer is a separate unit distinct from and detachable from the real-time computer after the calibration has been completed.

13. The system of claim 11, wherein said calibration computer performs the following operations:
during a data acquisition stage where the true or magnetic heading is known, inputs the magnetic field, pitch and roll values for each of a plurality of traverse angles of the turret with respect to the hull;
for each of a plurality of traverse angles, calculates an induced magnetism correction matrix and a permanent magnetism correction vector;
and stores said correction matrix and correction vector for each of the said plurality of traverse angles in said non-volatile memory of the real-time computer.

14. The system according to claim 13, wherein said system is calibrated by said computer for 16 evenly-spaced traverse angles.

* * * * *